(12) United States Patent
Díaz Carmena et al.

(10) Patent No.: US 6,871,715 B1
(45) Date of Patent: Mar. 29, 2005

(54) SYSTEM FOR CONTROLLING ELECTRIC MOTORS USED FOR THE PROPULSION OF A TRANSPORT TROLLEY

(75) Inventors: Francisco Díaz Carmena, Madrid (ES); Ángel Diaz Carmena, Madrid (ES)

(73) Assignee: Sociedad Espanola de Electromedicina y Calidad, S.A., Madrid (ES)

( * ) Notice: Subject to any disclaimer, the term of this patent is extended or adjusted under 35 U.S.C. 154(b) by 0 days.

(21) Appl. No.: 09/856,902

(22) PCT Filed: Nov. 24, 1999

(86) PCT No.: PCT/SE99/00381

§ 371 (c)(1),
(2), (4) Date: Aug. 15, 2001

(87) PCT Pub. No.: WO00/32459

PCT Pub. Date: Jun. 8, 2000

(30) Foreign Application Priority Data

Nov. 28, 1998 (ES) .............................................. 9802534

(51) Int. Cl.⁷ ................................................ B60K 1/00
(52) U.S. Cl. ....................... 180/65.5; 378/198; 318/628
(58) Field of Search ............................... 180/65.5, 65.8, 180/907; 378/193, 196, 197, 198, 102, 204; 318/628, 646

(56) References Cited

U.S. PATENT DOCUMENTS

| | | | |
|---|---|---|---|
| 3,986,090 A | * 10/1976 | Hecker et al. ............... 318/488 |
| 4,107,590 A | * 8/1978 | Pury et al. ................... 318/628 |
| 4,640,389 A | * 2/1987 | Kamaike ..................... 187/119 |
| 4,697,661 A | * 10/1987 | Pajerski et al. ............. 180/65.8 |
| 5,050,202 A | * 9/1991 | Yanome ...................... 378/167 |
| 5,234,066 A | * 8/1993 | Ahsing et al. .............. 180/65.8 |
| 5,343,971 A | 9/1994 | Heidelberg et al. |
| 5,425,069 A | * 6/1995 | Pellegrino et al. .......... 378/198 |
| 5,732,786 A | * 3/1998 | Fujigaki ..................... 180/19.3 |
| 5,771,988 A | * 6/1998 | Kikutani et al. ........... 180/65.5 |
| 5,878,829 A | * 3/1999 | Kanno et al. .............. 180/65.5 |
| 6,092,615 A | * 7/2000 | Pusch et al. ............... 180/65.5 |

FOREIGN PATENT DOCUMENTS

| | | |
|---|---|---|
| GB | 1263 261 | 2/1968 |
| ZA | 9304402 | 6/1993 |

* cited by examiner

Primary Examiner—Christopher P. Ellis
Assistant Examiner—Christopher Bottorff
(74) Attorney, Agent, or Firm—Klauber & Jackson

(57) ABSTRACT

A system is described for the controlled propulsion of a transporting device including at least two drive wheels propelled by electromotive units, in which system at least two drive wheels are each propelled by independent electric motors; each electric motor receives electric power through an independent power amplifier which amplifies electric signals produced by sensor devices; the sensor devices detect a mechanical force applied on a push and pull element, and convert the mechanical force into electric signals which indicate the degree and the direction of the mechanical force applied on the push and pull element, and the amplifier amplifies the signal in accordance with a factor which is a function of the weight that the trolley has to move and it feeds the electric motor so it can power the drive motor in accordance with a torque corresponding to the movement ordered through the sensor devices.

8 Claims, 4 Drawing Sheets

SYSTEM FOR CONTROLLING ELECTRIC MOTORS USED FOR THE PROPULSION OF A TRANSPORT TROLLEY

TECHNICAL FIELD OF THE INVENTION

The present invention lies within the technical field of devices propelled by an electromotive force and particularly in the sector of drive systems for electric trolleys and self-propelled devices.

STATE OF THE ART PRIOR TO THE INVENTION

At present, devices powered by electric motor, such as trolleys, fork-lifts or platforms for transporting loads, merchandise, pallets, crates, etc., jacks and self-propelled instruments like for example mobile X-ray units, find application in a plurality of industrial and commercial sectors.

Such devices are usually propelled by one or more drive wheels operated by electric motors, with the facility for the operator to select between functions of start/stop, forward/reverse movement and, in some cases, travelling speed. This type of device is handled by an operator standing on the floor who controls the direction and, where appropriate, the travelling speed by control means corresponding to the functions mentioned. The control means are usually situated on a lever or bar which, in order to direct the device to the left or to the right, is usually coupled to a frame or platform, having said frame or platform one or more wheels which turn freely and are swivel-coupled to the front or rear part of the body of the device, so that the displacing of the bar or lever to the right or to the left permits the device to be turned to the right or to the left.

These conventional devices, although very useful, have a number of drawbacks.

In this sense, a first drawback of the conventional devices is that by having the operations of turning to the right or to the left done by manually positioning the direction of the free wheels, the possibility of performing turns in confined spaces proves complicated. Furthermore, with this type of device, it also proves relatively complicated to move at an adequate speed and, consequently, for safe and precise handling, training in handling is necessary.

The European patent application EP 0 253 333 describes a control system for providing power to independently driven wheels of a power driven cart for transporting medical diagnostic equipment. A manually engageable handle is mounted to the cart in a position allowing a person to exert a manual force on the handle in a direction in which it is desired for the cart to move. Force sensors are coupled to the handle to sense the manual force applied to it in a plane parallel to the plane on which the cart is to be moved. The force sensors provide signals representative of the magnitude and direction of the manual force applied to the handle in forward, reverse and turning directions. Electronic circuits are coupled to the force sensors for providing control signals to motors driving the wheels of the cart for independently controlling direction and velocity of movement of the cart.

The features known in combination from this European patent are placed in the preamble of independent claim 1.

OBJECT OF THE INVENTION

The object of the present invention is to overcome the drawbacks mentioned above by means of a system which permits the controlled operation of a device propelled by electric motor, which is easy to handle without any need for intensive training, which can turn in confined spaces and which, in spite of being an active motorised element, behaves with a certain pasiveness which translates into a sensation of heaviness for the operator which contributes to the operator's handling of the device being intuitive, very precise, easy and quick.

DESCRIPTION OF THE INVENTION

In accordance with the invention, the aforementioned objects are achieved by means of a system for the controlled operation of a device propelled by an electric motor which comprises at least two drive wheels fitted at opposite ends of an axle, propelled by electromotive means, and control means for governing the propulsion of the drive wheels, in which each drive wheel is propelled by an independent electric motor and in that each electric motor is provided with independent control means. In accordance with the invention, these control means for each electric motor comprise an independent power amplifier which amplifies electrical signals produced by sensor means, and feeds electric power to the electric motor. The sensor means detect the mechanical force of pushing and pulling applied to a push and pull element by a user, and transforms said mechanical force into electrical signals indicating the degree of the force (e.g. strong, very strong or weak) at the direction (forward or backward) of the mechanical force applied in said push and pull element. The amplifier amplifies the signals in accordance with an amplification factor in terms of the weight of the device, and feeds the electric motor so that it powers the drive wheel in accordance with a torque corresponding to the movement ordered by the sensor means. The sensor means which order each electric motor can be operated separately in such a manner that each drive wheel can be propelled selectively.

In a preferred embodiment of the invention, the system comes with two wheels each propelled by its own electric motor as well as with first control means for the first electric motor and second independent control means for the second electric motor. In accordance with this embodiment, the first control means comprises first sensor means required by a first push and pull means, and the second control means comprises second sensor means required by a second push and pull means. Preferably, the first and the second push and pull element, are interconnected through a connecting element coupled in such a manner that pulling or pushing the connecting element by the user can act selectively on the first or the second push element.

In a preferred embodiment of the invention, the connecting element is a handle whose extremities act respectively on the respective push and pull elements, which in turn act on the respective sensors. With this arrangement, it is achieved that, by pushing or pulling the handle, the operator is able to manoeuvre in an especially easy and comfortable manner. Thus, when the handle is situated at the rear of the device and the operator wishes to start to move forwards, he has only to grasp the handle with both hands, one on the left part of the handle and the other on its right part, and push it with the same force by both hands. In this manner, the extremities of the handle shall apply the same pressure on the two sensors which shall transmit the electrical signals corresponding to their respective control means so that both electric motors operate at the same speed. When the operator wishes to turn to the right, he pushes the handle more firmly in his left hand, so that the control means on the left side order the electric motor on the left to rotate at a greater speed than that on the right and, consequently, the left drive wheel turns more quickly than the right one and, if it is wished to turn to the left he pushes more firmly in his right hand in which case the control means of the right side and, consequently, the right side electric motor and the right drive wheel work in a way as the described above with respect to the manoeuvre of turning to the right. When the operator wishes to start to reverse, he pulls the handle instead of pushing it, in the same way as the described before with respect to moving forwards.

When the operator wishes to turn the device around, he pushes the handle with the opposite hand to that of the turning direction and simultaneously he pulls the handle with his other hand. In this case, the motor and, consequently, the drive wheel of the side on which the operator pulls the handle rotates backwards whereas the drive wheel on the side on which the operator pushes the handle rotates on the opposite direction, thereby making it possible for the device to turn around completely.

Likewise, the operator can select the travelling speed by simply pushing or pulling the handle with variable strength.

In a preferred embodiment of the system of the invention each of the control means also comprises first preamplifier means which amplifies the electrical signals produced by the sensor means as a function of the pushing or pulling force detected, which feeds preamplified signals to the power amplifier which supplies the drive wheel. In this preferred embodiment, it is also especially beneficial that each of the control means comprises also for each power amplifier, a feedback circuit which compares, by comparator means, the true value of electric power supplied to the electric motor with the pre-established value of electric power necessary to achieve movement of the of the drive wheel, and transforms the difference detected—which arise for example when the drive wheel is on a ramp sloping upwards or downwards— between the true value and the pre-established value, into error signals by means of which the input electrical signals to the power amplifier are altered in order that the latter supply the necessary power to the electric motor for it to rotate on a basis of the torque required to perform the movement ordered by the sensor means. In this manner it is achieved that the unevenness of the surface over which the device is travelling is automatically offset insofar as its possible effect on the motion of the device is concerned, and the movement is therefore uniform. Appropriately, each feedback circuit comprises a second preamplifier means which amplifies the error signals.

In an especially preferred embodiment of the system of the invention, the latter is incorporated into a mobile X-ray unit. It is well known these units are very heavy (400–600 kg, usually) and have to be capable of being manoeuvred often in very confined spaces, by personnel not accustomed to handling this type of apparatus frequently.

According to the invention, the amplification factor applied to the power amplifier is calculated so that a relation is maintained between the weight of the propelled device and the application of a reasonable force on the push and pull elements by the user.

As sensors for detecting the pushing or pulling force applied by the operator, use can be made of load cells (like for example extension-measuring gauges), pressure detectors, and also piezoelectric, optical, magnetic, capacitive and resistive sensors.

As power amplifiers use can be made of standard instrumentation amplifiers and preamplifiers for the input signals, such as those marketed by the company ANALOGUE DEVICE.

DESCRIPTION OF THE DRAWINGS

The invention is described hereunder on the basis of an embodiment shown in the drawings attached hereto which form an integral part of this descriptive specification, in which.

DESCRIPTION OF A PREFERRED EMBODIMENT OF THE INVENTION

Figure 1:
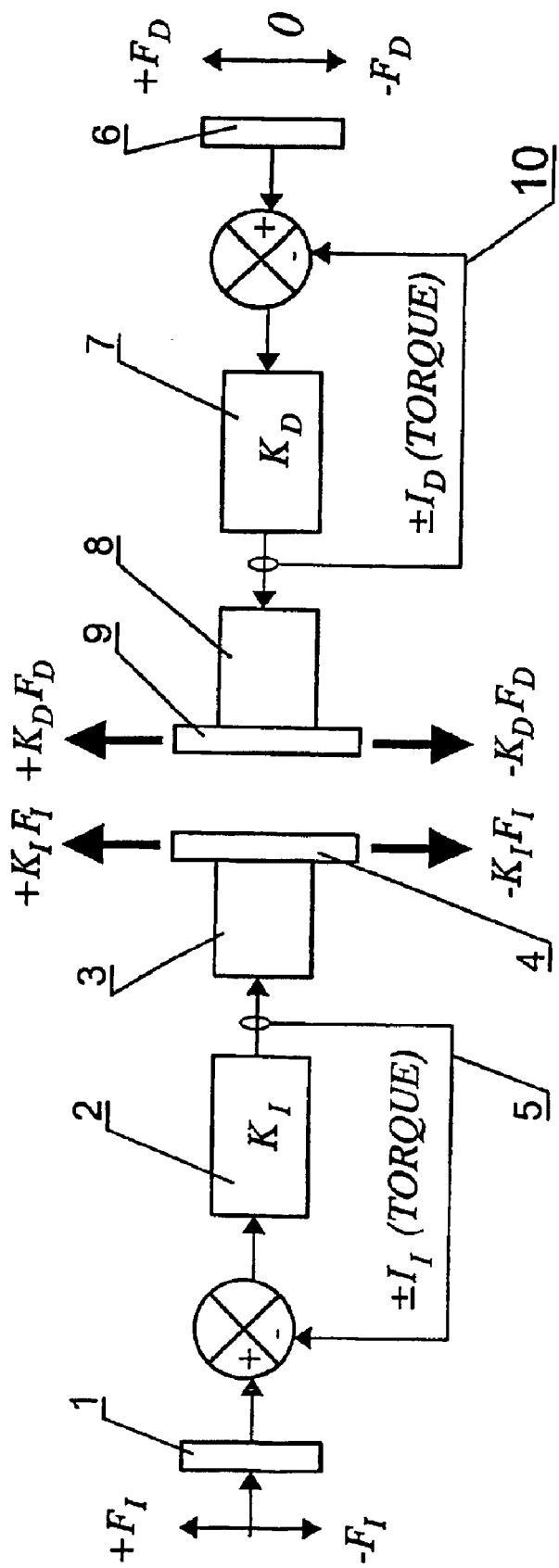
FIG. 1 shows a schematic block diagram which shows the basic electronic and electrical elements of the system of the invention in an embodiment applied to a device propelled by two drive wheels.

As can be appreciated from FIG. 1, the system comprises a force sensor 1 which detects the mechanical force of pushing, +FI, or pulling, −FI, applied by the operator, and transmits signals indicating the forces detected to the power amplifier 2. The amplifier 2 amplifies the signal by a factor KI and supplies the resulting electric power to the left, direct current motor 3, which powers the left drive wheel 4. A feedback circuit 5 which measures the motor current which is proportional to the torque, detects any difference between the nominal value and the true value and generates, in the event of there being differences between these values, an error signal which is applied to the amplifier 2 in addition to the signal received from the force sensor 1. FIG. 1 also shows the layout of the elements for controlling and propelling the right wheel, comprising the right force sensor 6 which detects the pushing +FD, or pulling forces, −FD, applied by the operator, the right amplifier 7, the right electric motor 8, the right drive wheel 9 and the right feedback circuit 10. For the propulsion of the left wheel an entirely similar layout of elements is provided.

Figure 2:
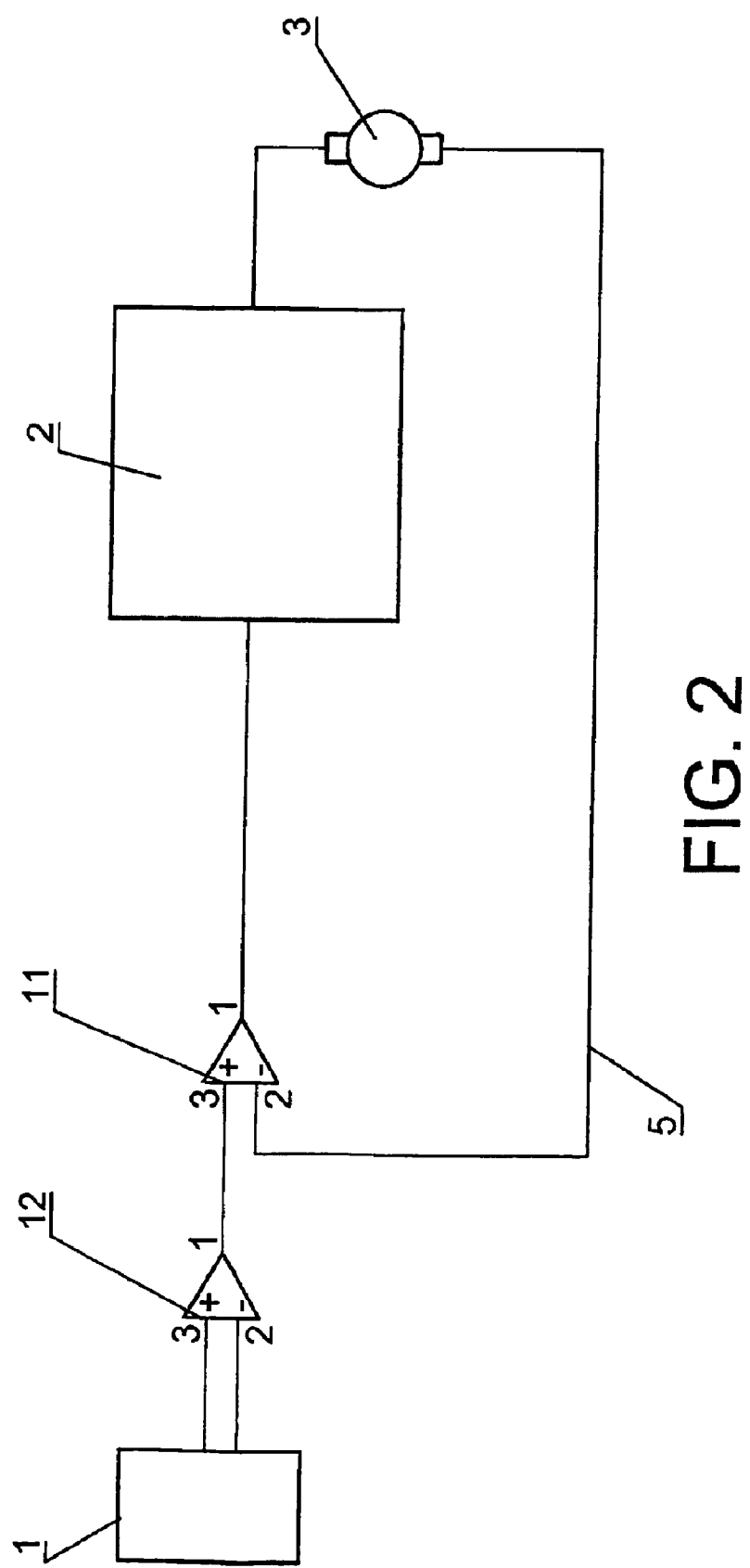
FIG. 2 shows a schematic block diagram, corresponding to FIG. 1, of the basics elements related with the control of the left side drive wheel.

It can be appreciated from FIG. 2 that the left side feedback circuit 5 comprises a preamplifier 11 for the error signal and another preamplifier 12 for the signal received from the force sensor 1. The layout shown in FIG. 2 for the left side is entirely similar to the layout of elements on the right side (not shown in FIG. 2).

Figure 3:
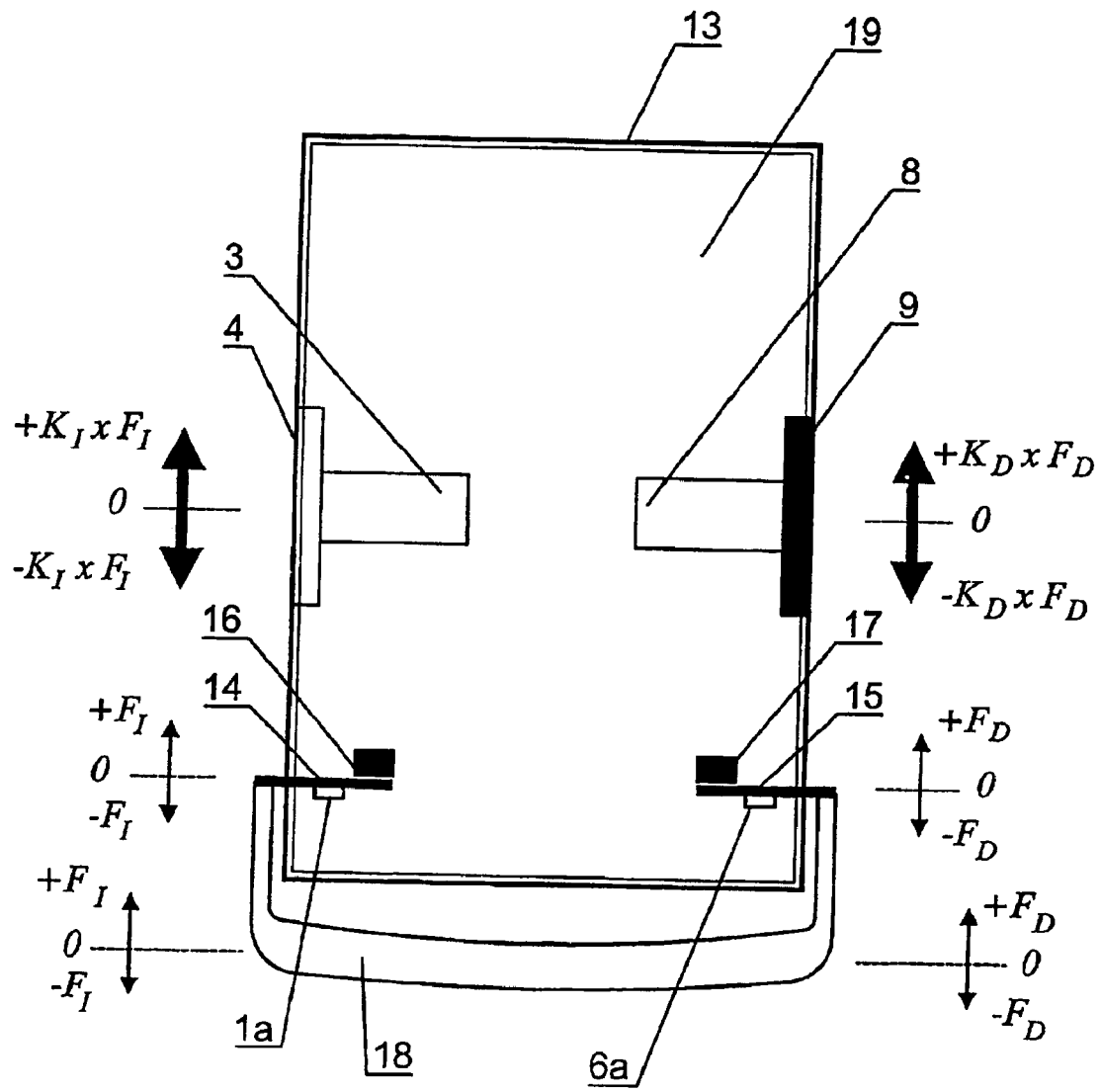
FIG. 3 shows a schematic plan view of the most significant components of the system in the embodiment illustrated in FIG. 1.

FIG. 3 shows the physical layout of:

the force sensors 1, 6 comprising extension-measuring gauges (VISHAY) 1a, 6a, the electric motors 3, 8, the drive wheels 4, 9 in a mobile X-ray unit 13, the push and pull elements 14, 15 comprising spring metal bands, anchored in respective fasteners 16, 17 of the unit 13 framework, said push and pull elements being joined to each other, at their outside extremities, by means of a handle 18.

It can also be appreciated that, in the embodiment shown in FIG. 3, the power supply is a set of rechargeable batteries 19.

Figure 4:
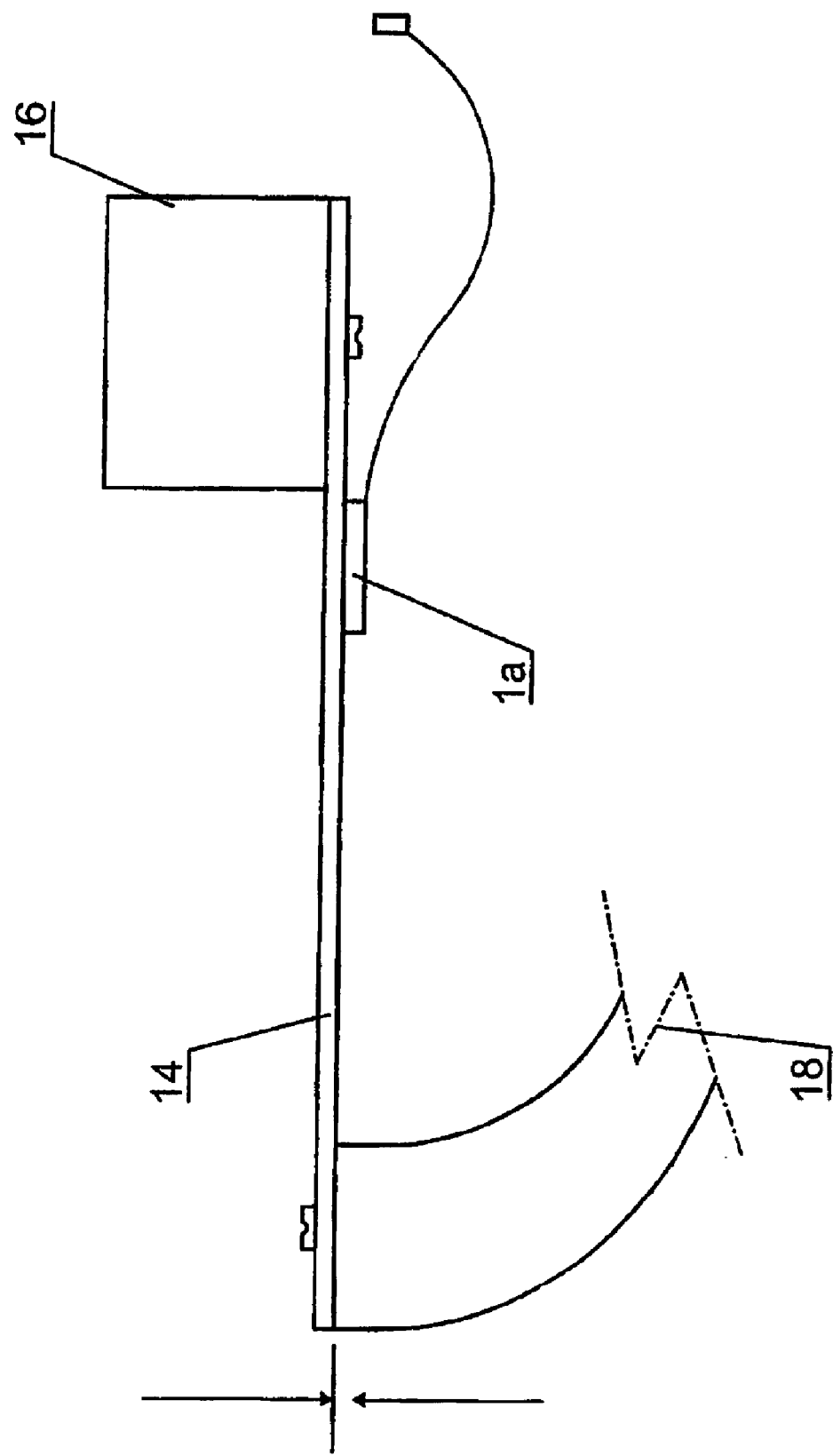
FIG. 4 is a schematic view of the disposition the handle, the left side force sensor and the left side push and pull element, shown in FIG. 3.

FIG. 4 shows in greater detail the layout of the force sensor 1a, of the push and pull element 14 and of its fastener 16, as well as of the handle 18.

From FIGS. 3 and 4 it can be deduced that when the user pulls or pushes the handle 18, this results in a forward or backward spring deformation of the band corresponding 14, 15, which deformation is detected by the respective extension-measuring gauge 1a, 6a and converted into an electrical signal in accordance with that explained above. Due to the flexibility of the bands 14, 15, when the user is not pushing or pulling the handle, released either intentionally or accidentally, the bands return to their stop position and, as a result, the motion of the unit is halted.

The embodiment illustrated in the figures can be applied, by way of example, to a self-propelled mobile X-ray unit, of approximately 400 kg in weight. In this case use can be made of two GSC electric motors 3, 8, each with a power of 500 W and a torque of 15 Nm, two ANALOGUE DEVICE power amplifiers, each of 500 W, which incorporate the preamplifiers 11, 12 of the left feedback circuit 5 and the preamplifiers (not shown) of the right feedback circuit 10. To provide the user with a sensation of heaviness which permits him to push and pull the unit with greater security, it has been calculated that he should apply a force, in respect of each hand, of between 0 (=stopped) and 4 kg when pushing +FI, +FD, or pulling −FI, −FD, detectable by the force sensors 1, 6. The power amplifiers 2, 7, multiply these pushing or pulling forces by factors KI, KD which can be set for example in 11 and feed the corresponding power to the electric motors 3, 8 so that they can propel the wheels 4, 9 with the necessary forces +KIFI, −KIFI, +KDFD, −KDFD. When the operator is moving the unit on a downward slope and is pushing with maximum force of 4 kg, this implies the unit will be travelling at the maximum attainable speed. When moving the unit over a flat floor or on an upward slope, the maximum speed is reduced in order to achieve a greater drive force. Depending on the force applied, the operator can therefore regulate the travelling speed over each surface.

What is claimed is:

1. A system for controlled operation of a device propelled by electric motors, said system having:
    at least a first and a second drive wheel mounted in an axially opposed manner, each of said first and second drive wheels for propelling the device forward and backward;
    at least a first independent electric motor for propelling the first drive wheel and a second independent electric motor for propelling the second drive wheel;
    a first and a second push and pull element;
    at least a first independent control means for the first independent control means for the first independent electric motor and a second independent control means for the second independent electric motor, each control means having:
    a plurality of sensor means;
    an independent power amplifier; the sensor means:
    detecting the mechanical force of pushing and pulling applied to the push and pull elements by a user standing on a floor;
    transforming said mechanical force into signals indicating degree and direction of the mechanical force;
    capable of being operated separately so as to power each drive wheel selectively; the independent power amplifier:
    amplifying the electric signals produced by the sensor means;
    supplying electric power to the electric motor;
    the electrical signals being amplified in accordance with an amplification factor as a function of the device weight;
    each drive wheel being propelled in accordance with a torque corresponding to movement ordered by the sensor means;
    wherein:
    each power amplifier is provided with a feedback circuit that measures a true value of an electric motor current said motor current being proportional to a torque of the electric motor, the feedback circuit comprising:
    a comparator means for comparing said true value with a pre-established nominal value of an electric current needed to achieve movement of each drive wheel,
    a detecting means for detecting differences detected between the true value and the pre-established value,
    a transforming means for transforming said differences into error signals;
    an altering means for altering the electric input signals to the power amplifier on the basis of said error signals, so as to make said power amplifier supply the necessary power to the electric motor so that torque needed for producing movement ordered by the sensor means is generated by the electric motor.

2. A system according to claim 1 wherein each one of the control means further comprises a first preamplifier means for amplifying electric signals produced by the sensor means.

3. A system according to claim 1 wherein the feedback circuit further comprises a second preamplifier means for amplifying error signals.

4. A system according to claim 1 further comprising a connecting element for coupling the push and pull elements, so as to allow a user to act selectively on the first or the second push and pull element by pushing or pulling said connecting element.

5. A system according to claim 4, wherein
    the push and pull elements,
    the force sensors, and
    the connecting element, are arranged so as to form handle.

6. A system according to claim 4 wherein:
    the push and pull elements comprise bands having a first extremity and a second extremity, the first extremity being coupled to the connecting element and the second extremity being held immobile in fasteners;
    the force sensors comprise extension-measuring gauges arranged on the bands for detecting a deformation on each band when the connecting element is pushed or pulled.

7. A system according to claim 1 wherein the at least two drive wheels comprises two drive wheels.

8. A system according to claim 1 wherein the device propelled is a mobile X-ray unit.

* * * * *

UNITED STATES PATENT AND TRADEMARK OFFICE
CERTIFICATE OF CORRECTION

PATENT NO. : 6,871,715 B1
DATED : March 29, 2005
INVENTOR(S) : Francisco Diaz Carmena and Angel Diaz Carmena It is certified that error appears in the above-identified patent and that said Letters Patent is hereby corrected as shown below:

<u>Title page,</u>
Item [86], PCT No., please change from "PCT/SE99/00381" to -- PCT/ES99/00381 --.

Signed and Sealed this

Thirteenth Day of September, 2005

JON W. DUDAS
*Director of the United States Patent and Trademark Office*